US011379705B2

(12) United States Patent
Ambeck-Madsen et al.

(10) Patent No.: US 11,379,705 B2
(45) Date of Patent: Jul. 5, 2022

(54) SYSTEM AND COMPUTER-BASED METHOD FOR SIMULATING A HUMAN-LIKE CONTROL BEHAVIOUR IN AN ENVIRONMENTAL CONTEXT

(71) Applicants: TOYOTA MOTOR EUROPE, Brussels (BE); CAMLIN ITALY S.R.L., Parma (IT)

(72) Inventors: Jonas Ambeck-Madsen, Brussels (BE); Aymeric Rateau, Woluwe Saint Lambert (BE); Marcello Mastroleo, Acquaviva Delle Fonti (IT); Federico Sassi, Poviglio (IT); Roberto Ugolotti, San Polo d'Enza (IT); Alessandro Bacchini, Fidenza (IT); Luca Mussi, Parma (IT); Luca Ascari, Parma (IT)

(73) Assignees: TOYOTA MOTOR EUROPE, Brussels (BE); CAMLIN ITALY S.R.L., Parma (IT)

( * ) Notice: Subject to any disclaimer, the term of this patent is extended or adjusted under 35 U.S.C. 154(b) by 1206 days.

(21) Appl. No.: 15/874,293

(22) Filed: Jan. 18, 2018

(65) Prior Publication Data
US 2018/0157957 A1 Jun. 7, 2018

Related U.S. Application Data

(63) Continuation of application No. PCT/EP2015/066952, filed on Jul. 23, 2015.

(51) Int. Cl.
*G06Q 20/40* (2012.01)
*G06Q 10/06* (2012.01)
(Continued)

(52) U.S. Cl.
CPC .......... *G06N 3/004* (2013.01); *G06K 9/6251* (2013.01); *G06N 3/04* (2013.01); *G06N 3/06* (2013.01);
(Continued)

(58) Field of Classification Search
CPC .......... G06N 3/004; G06N 20/00; G06N 3/04; G06N 3/06; G06K 9/6251; G10L 25/27; G06F 17/12
(Continued)

(56) References Cited

U.S. PATENT DOCUMENTS

| 2010/0329556 A1* | 12/2010 | Mitarai | G06K 9/6251 382/170 |
| 2017/0091637 A1* | 3/2017 | Chae | G16B 40/20 |

(Continued)

FOREIGN PATENT DOCUMENTS

| CN | 101354887 A | 1/2009 |
| CN | 101853239 A | 10/2010 |

(Continued)

OTHER PUBLICATIONS

Translation of Dec. 29, 2020 Office Action issued in Chinese Patent Application No. 201580081857.3.
(Continued)

*Primary Examiner* — Brandon S Cole
(74) *Attorney, Agent, or Firm* — Oliff PLC

(57) ABSTRACT

A computer-based method for simulating a human-like decision in an environmental context, comprising: capturing environmental data with at least one sensor, realising a computer based method for realising a bi-directional compression of high dimensional data by compressing the data into a lower-dimensional map, if environmental data are captured during a learning phase of a computer-based model, evaluate the map of compressed data by determining
(Continued)

the quality of the map by how well it separates data with different properties, the captured data corresponding to known pre-recorded data that have been pre-evaluated, if environmental data are captured after the learning phase, add new point to the compressed data and generate a signal indicating which human-like decision to use to correspond to the state of the operator.

12 Claims, 1 Drawing Sheet

(51) Int. Cl.
| | |
|---|---|
| *G06K 9/00* | (2022.01) |
| *G06K 9/62* | (2022.01) |
| *G06N 3/00* | (2006.01) |
| *G06N 20/00* | (2019.01) |
| *G06N 3/04* | (2006.01) |
| *G06N 3/06* | (2006.01) |
| *G10L 25/27* | (2013.01) |
| *G06F 17/12* | (2006.01) |

(52) U.S. Cl.
CPC .............. *G06N 20/00* (2019.01); *G10L 25/27* (2013.01); *G06F 17/12* (2013.01)

(58) Field of Classification Search
USPC ....................................................... 706/1–62
See application file for complete search history.

(56) References Cited

U.S. PATENT DOCUMENTS

| | | | | |
|---|---|---|---|---|
| 2017/0300911 A1* | 10/2017 | Alnajem | ............ | G06Q 10/0635 |
| 2018/0157957 A1* | 6/2018 | Ambeck-Madsen | .... | G06N 3/04 |

FOREIGN PATENT DOCUMENTS

| | | |
|---|---|---|
| JP | 2005-212709 A | 8/2005 |
| JP | 2012-079178 A | 4/2012 |
| WO | 99/31624 A1 | 6/1999 |
| WO | 2014/009031 A2 | 1/2014 |

OTHER PUBLICATIONS

Mar. 5, 2019 Office Action issued in Japanese Patent Application No. 2018-522849.

Ren, et al. "Incremental learning of bidirectional principal components for face recognition". Pattern Recognition, vol. 43, pp. 318-330, 2010.

Zuo, et al. "Bidirectional PCA With Assembled Matrix Distance Metric for Image Recognition". IEEE Transactions on Systems, Man, and Cybernetics, vol. 36, No. 4, pp. 863-872, 2006.

Jun. 23, 2016 International Search Report issued in International Patent Application No. PCT/EP2015/066952.

Wangmeng Zuo et al., "Bidirectional PCA with assembled matrix distance metric for image recognition", IEEE Transactions on Systems, Man and Cybernetics., vol. 36, No. 4, pp. 863-872, 2006.

Ren C-X et al., "Incremental learning of bidirectional principal components for face recognition", Pattern Recognition, Elsevier, GB, vol. 43, No. 1, pp. 318-330, 2010.

Dong Huang et al., "Manifold-Based Learning an Synthesis", IEEE Transactions on Systems, Man and Cybernetics. Part B: Cybernetics, vol. 39, No. 3, pp. 592-606, 2009.

Dalton Lunga et al., "Spherical Stochastic Neighbor Embedding of Hyperspectral Data", IEEE Transactions on Geoscience and Remote Sensing, vol. 51, No. 2, pp. 857-871, 2013.

Laurens van der Maaten et al., "Visualizing Data using t-SNE", Journal of Machine Learning Research, pp. 1-25, 2008.

Mike Gashler et. al., "Iterative Non-linear Dimensionality Reduction by Manifold Sculpting", NIPS, vol. 8, pp. 1-8, 2007.

Ronald Coifman et. al., "Diffusion maps", Applied and Computational Harmonic Analysis, vol. 21, pp. 5-30, 2006.

Nov. 30, 2021 Office Action issued in Japanese Patent Application No. 2020-163483.

* cited by examiner

SYSTEM AND COMPUTER-BASED METHOD FOR SIMULATING A HUMAN-LIKE CONTROL BEHAVIOUR IN AN ENVIRONMENTAL CONTEXT

BACKGROUND OF THE INVENTION

The invention relates to a computer-based method for simulating a human-like control behaviour in an environmental context, and in particular such a system and method including a computer-based method for realising a bi-directional compression of data.

Today, assisting systems are used for many applications in almost any kind of industry. Especially the automotive industry or the aviation industry as well as in computational industry assisting systems are commonly used to facilitate for a user the operating systems. In automotive industry, well known systems like ESC (Electronic Stability Control) for improving the safety of the vehicle's stability by detecting and minimizing of the skidding, or EBA (Emergency Brake Assist) to ensure maximum braking power in emergency situations by interpreting the speed and the force at which a brake pedal is pushed are widely-used. In aviation industry active autopilots or so called fly-by-wire systems are commonly used in modern civil as well as military aircrafts, where electronic interfaces replace the manual flight control by converting the movements of the flight controls into electronic signal and initiate flight control without human interference.

Additionally, the number of sensors and actuators integrated in the systems, like vehicles or aircrafts, increases rapidly with the aim to watch over and/or control almost each and every component in these systems electronically.

One problem arising from the increased number of sensors and actuators is the amount of data to be handled and/or analysed for recognising a specific situation or operational status of the systems.

It is an intention of modern assisting systems to provide a robust, sensitive and real-time monitoring of human intention while operating a machine in a dynamically changing environment. Such modern assisting systems enable efficient and safe operation of a machine, optimized to actual human intended operation. Such machine may be any kind of system to be operated by a human, like e.g. a vehicle, an aircraft, a ship, a machine etc. as well as computational systems like, e.g. a computer game, or the like. In the following, the term "system" should be understood as any kind of these.

Assisting systems generally use virtual development methods. Such methods are quickly gaining importance in the vehicle development process to cope with important business challenges: shortening time-to-market, optimising product quality, performance & value, reducing production & development costs, dealing with ever stricter emission & safety regulations. For example, a particular challenge in the Engine and Powertrain field is the upcoming European "Real Driving Emissions" (RDE) regulation. RDE compliance requires control of vehicle exhaust emissions over a wide area of operating conditions. This heavily impacts the engine calibration process which was traditionally based on a fixed driving cycle.

Virtualising part of the calibration process allows evaluating the vehicle & engine behaviour under various real-life driving conditions by running a physical or grey-box vehicle model over a virtual driving environment, operated by a virtual Driver Model.

Perceptual/cognitive architectures with an artificial (i.e. implemented on a machine, or in or as a computer or in or as a tool) memory system are used as such assisting systems. They are particularly suited for understanding and controlling the dynamic behaviours of a tool in response to the human operator, especially for actual and safe interactions of operator and tool in real-time in a dynamically variable environment.

Document WO 2014 009031 relates to a method or system or architecture, in particular a perceptual/cognitive architecture with an artificial memory system, comprising:
- at least one first node being adapted to store and recall (e.g. long) input sequences, such (e.g. long) input sequences being modelled as an event;
- at least one second node being adapted to extract and save prototypes from raw data, each prototype being representative of data chunks, characterizing real world operation (of a tool within its environment) with features which are similar.

In the architecture disclosed in this document, the second node provides the input for the first node. The raw data is typically data obtained from sensors, e.g. sensors that sense the activity of actuators or control elements of a machine or tool.

An artificial memory system is generally composed of several nodes each of them solving a specific task like for example, one of the following ones: spatial pooling, signal quantization, temporal and forced temporal pooling, event and forced event pooling. The functionality of the whole system is achieved by connecting these nodes with different kind of oriented connections, like: Feed Forward (FF) input/output, Feed Back (FB) input/output, State Consistency Check, and so on.

The Memory Prediction Framework (MPF) described in this document is in a particular embodiment an "artificial memory recalling system" inspired by the functioning of the mammalian neocortex, able to identify, store, recognize spatial/temporal patterns of sensed parameters, able of classifying the events being exposed to, and predicting over time. An MPF network is composed of a hierarchical set of nodes that can contain a neural gas-like adaptive memory system, able to analyse different spatial-temporal inputs in parallel and then communicate throughout the hierarchy in order to discover higher level behaviours and properties.

The three main purposes of a node, which has an input and an output, are to learn and recognize peculiar input patterns, associate them to a number of external (possibly unknown) causes or events, and finally predict the next input pattern(s).

To these aims two different phases are usually distinguished: the training phase, or learning phase, used to learn input patterns, which affects the internal "memory" of a node, and the inference phase which is the actual operational phase for a node during which input patterns are compared against memorized ones and FF and FB outputs are generated.

Actually nothing prevents a node to operate in a "continuous learning" way in which training and inference are performed together. Another possibility is to have a very short initial training phase, used to overcome the "cold start" problem, followed by a continuous learning phase.

In any case, the purpose for the inference phase is to evaluate the current input pattern in order to associate it to one or more, learned causes. This results in the generation of a FF output signal which represent the likelihood for the current input pattern to belong to one of the learned causes. This process is usually affected also by the FB input signal which represents a prediction for the current FF output signal provided by a parent node. This last feature is intended to permit a node to disambiguate among different causes which might share common input patterns: this is usually referred to as "focus of attention", After the generation of the FF output a node should also generate a prediction for its next input pattern to be signalled to child nodes via its FB output: this might require to wait for all the network to finish the FF update in order to propagate prediction from top to bottom nodes.

It is evident that the inter-nodes exchange of information by means of FF and FB connections is at the core of the memory prediction framework (MPF) such as disclosed in WO 2014009031 mentioned here above.

Thus, the efficiency of communication between nodes impacts the whole system both in terms of the number of bits than can be exchanged, and the computational effort within the node. Indeed, the greater the efficiency is the more bits can be exchanged between two nodes and the less computational effort within a node is needed to process a same amount of data.

Bi-directional mapping is a technique to perform dimensionality reduction avoiding the typical drawbacks of common techniques such as Principal Component Analysis (PCA) and manifold learning algorithms in general. In particular, avoid linearity, which is a constraint on the learned manifolds shape which results in maps with low accuracy, and avoid directionality, which contributes in the impossibility to recover original high dimensional points from their low dimensional representation.

In the article entitled "Visualizing Data using t-SNE" by Laurens van der Maaten and Geoffrey Hinton and published in the Journal of Machine Learning Research, volume 1 (2008) pages 1-48, is disclosed a well-known computer based method named t-Distributed Stochastic Neighbour Embedding (t-SNE).

The t-SNE method allows visualizing high-dimensional datasets exploiting a dimensionality reduction which preserves proximity without any possible inference on the visualisations.

OBJECT AND SUMMARY OF THE INVENTION

The invention aims to improve a memory prediction framework global efficiency by performing an invertible dimensionality reduction on the inter-node communication which allows a data-dependent bi-directional mapping between high- and low-dimensional spaces.

This goal is reached thanks to a computer based method for realising a bi-directional compression of data by compressing high dimensional data into a lower dimensional map, e.g. a two- or three-dimensional map, the method comprising a reception of data with a first dimension greater than one, for example data captured and transmitted by at least one sensor, and a compression of said data or attributes derived from said data, such as segments of GPS data or segments of data of the on-board electronic control unit of a vehicle, into compressed data with a second dimension lower than the first dimension.

According to a general feature of this computer based method, for two metric spaces $X=(x,\mu_x)$ and $Y=(y,\mu_y)$ with x a first space which dimension is greater or equal than the dimension of a second space y, $\mu_x$ a first metric on said first space x, $\mu_y$ a metric on said second space y, and P being a first set of n points belonging to said first space x, a point being an element of a space, the compression is realized by finding a second set of n points Q belonging to said second space y such that:

$$Q = \operatorname{argmin}_{t \in y^n} d(A_1(\mu_x(P)), A_2(t))$$ (Equation 1)

where $d(.,.)$ is a symmetric distance function on the space of square matrices, while $A_1$ and $A_2$ are any two functions holding the following properties, A being any of $A_1$ or $A_2$ functions:

A: $R_+ \to [0, 1]$,
A(0)=1,
$\lim_{x \to \infty} A(z) = 0$,
$A(z_1) > A(z_2)$ if and only if $z_1 < z_2$.

$A_1$ and $A_2$ can be any function holding said properties, including:

$$A(z) = e^{-\frac{z}{s}}$$

with s>0, or $$A(z) = e^{-\left(\frac{z}{s}\right)^2},$$

with s>0, or $$A(z) = \frac{1}{1 + \left(\frac{z}{s}\right)^2}$$

with s>0, or $$A(z) = \frac{1}{1 + \left(\frac{z}{s}\right)}$$

with s>0.

Once equation 1 is solved for each of the n points of the first set of n points P, correspondence between points, referenced as BiMap, of the two set of n points P and Q, ice, BiMap=(P,Q), can be used as a translation atlas to transform points of said first space x into points of said second space y and vice-versa by means of equations 2 and equation 3 which follow.

First and second spaces x and y are general spaces where dimension of y is smaller than dimension of x. The computer-based method creates a correspondence between points in x and points in y. Thus the compression is achieved by having the points of y in a smaller dimension than the points of x. This compression method is defined so as to be bi-directional as it allows both compression and decompression of data, in contrast to the other manifold learning algorithms which allow only compression and not decompression of data.

The two main difference between this computer based method and the t-SNE computer based method consists in the possibility given here to both add new point to a map without the need to re-compute the whole map, and create an inverse correspondence from matrix y to matrix x to recover a higher dimensional point from its lower dimensional representation.

Indeed, t-SNE does not create any mapping and any addition of a new point constrains to re-compute all the data to visualize ft.

The second difference with t-SNE is also the main difference with the standard manifold learning computer based methods as disclosed in the article entitled "Iterative non-linear dimensionality reduction with manifold sculpting" from Gashler et. al. and published in NIPS (2007), volume 8, pages 513-520, and in the article entitled "Diffusion maps" from Coffman et al and published in the magazine Applied and computational harmonic analysis, volume 21, issue 1, July 2006, pages 5-30.

Moreover, depending on the choice of functions $A_1$ and $A_2$ the computer based method can accurately transport the proximity relation from P to Q, and/or can show self-clustering features, and/or help to highlight hidden patterns in data. For example if A1 and A2 are the same function then the proximity relation is accurately transported, while whenever A2 has a fatter tails than A1, then points which are not so close on x will be spread away on the projection over y, thus highlighting the neighborhood structure, i.e. the clustering, of the original points in x.

In a first aspect of this computer based method, it further comprises an extraction of attributes from at least one data before initiating said bi-directional compression.

The extraction of attributes from each data enables to already sort out the elements of each data considered as relevant for future operations and thus already realise a first compression of used data by only keeping the relevant parts, i.e. attributes, for the bi-directional compression into two- or three-dimensional maps.

Moreover, the extraction of attributes such as spatiotemporal attributes helps simplifying the training of a computer-based model using the bi-directional mapping compression.

In a second aspect of this computer based method, said compression method comprises a compression of a new point m belonging to matrix x on matrix y by solving the following equation:

$$\tilde{y} = \mathrm{argmin}_{t \in y} d(A_1(\mu_x(P,m)), A_2(\mu_y(Q,t))) \quad \text{(Equation 2)}$$

and a decompression of a new point t belonging to matrix y on matrix x by solving the following equation:

$$\tilde{x} = \mathrm{argmin}_{m \in x} d(A_1(\mu_x(P,m)), A_2(\mu_y(Q,t))) \quad \text{(Equation 3)}$$

where $\mu_x(P,m)$ and $\mu_y(Q,t)$ are the distance vectors between the points of BiMap and the new points in the corresponding respective spaces, BiMap is a correspondence between points of x and points of y given by Equation 2 (compressing) and equation (3) decompressing.

Moreover $A_1(\mu_x(P,m))$ or $A_2(\mu_y(Q,t))$ can be used to assess an objective Map Distortion Index (MDI) when a new point m or t needs to be mapped in Y or X respectively. Indeed, the mapping accuracy obtained by this computer-based method depends on the closeness with respect to the points in the atlas BiMap=(P,Q). The dependence is expressed by searching the point which has minimum activation distortion from the learned ones, i.e. solving equation 2 or equation 3. The possibility to assess an MDI leads to both a point section scheme in the X space in order to have more accurate atlas and to an intrinsic anomaly detection mechanism to support or to implement the context check within the MPF.

Another object of the invention is to provide a computer-based method for simulating a human-like decision in an environmental context. The method comprises the following steps:

capturing environmental data with at least one sensor,
realising a computer based method for realising a bi-directional compression of data by compressing high dimensional environmental data into a lower dimensional map as defined above,
if environmental data are captured during a learning phase of a computer-based model, evaluating the map of compressed data by determining the quality of the map by how well it separates data with different properties, said captured data corresponding to known pre-recorded data that have been pre-evaluated,
if environmental data are captured after said learning phase, add new points to said compressed data and generate a signal indicating which human-like decision to use to correspond to the state of the operator.

Depending on the environmental context and the use of the method, the human-like decisions simulated can be human judgements about their environments taking into consideration some first type of environmental data like sounds for example, or human-like control behaviour control for example to predict what kind of action a human, a driver e.g., is going to take knowing some second type of environmental data like the position, the speed and the gear of the car, or other kinds of human-like decisions.

Thus, in an architecture comprising a memory prediction framework, this computer-based method can act in three different ways: First as an input data pre-processing, second as an internode feedforward and feedback data compression, and third as a node output classifier.

In the first configuration, i.e. the input data pre-processing, the role played by the bi-directional mapping computer-based compression method is to let the network process data from a domain with less dimensions, thus saving both memory and computational power.

In the second configuration, i.e. the internode feedforward and feedback data compression, the bi-directional mapping computer-based compression method is used to compress feedforward outputting from the lowest level node and decompress the feedback outputting from the highest level one.

In the third configuration, i.e. the node output classifier, the bi-directional mapping computer-based compression method helps to visualize the learning dynamics within a node, thus to help the human qualitative interpretation of the information stored in it. In this case the compression method acts as a clustering based classifier.

In the second configuration, during inference tasks which happen after the end of the learning phase, according to WO 2014 009031 an MPF node computes the distance, with respect to a defined metric, between the current input and all its stored coincidences, hence it outputs the feedforward signal consisting in a distance related probability distribution of the input being a sample of the known stored coincidences.

The space of coincidence, within a node, is coupled with a metric implying both that the coincidences have a naturally defined spatial notion within the node input space and that the feedforward signal is a codification of the input in terms of its position within the input space by using the coincidences as reference points.

In other words, for any new input M the output of an MPF node N is the vector $A_N(\mu_N(C,m))$, with $A_N(.)$ the activation function of the node N, $\mu_N(.)$ its metric, and C the set of its coincidences.

Thus the output of any node is the first half of equation 2 and symmetrically a feedback output is the second part of equation 3.

In particular, the dimensionality of the output of each node increases with the memory size of the node itself. During real-world usage of the MPF, i.e. during inference phase, it is possible to have nodes with output dimensionality of hundreds or thousands of probabilities. The need for dimensionality reduction is important when stacking nodes in a hierarchy, like the MPF, since the nodes in the above levels must learn from the output of the nodes in the lower ones.

In particular a smaller dimension input means reduced computational power needed to perform all the MPF capabilities.

This problem is even more relevant when a higher level node receives as input the output of several lower level ones, then the dimension of its input space grows accordingly to the sum of the number of coincidences of its input nodes.

The need of back projection in feedback connections clearly follows, since it is mandatory for many MPF features.

Moreover, whenever the order of C exceeds by at least one the number of dimension of the input space N, there is a one to one correspondence between the position of the input m within the node input space and the space of the feedforward signals in output, meaning that any further correspondence add redundancy to $A_N(\mu_N(C,m))$ which can be cleared out by said compression method.

Nowadays, the sound quality of a car is a very important aspect considered by a consumer, for example when buying a new car. Since the sound quality is mostly a subjective aspect, there are no reliable ways to objectively evaluate the quality. Therefore the evaluation step during the car development usually relies on judgments given by experts, often on a relative scale between different cars.

Thus, this aspect of this computer-based method enables to objectify the subjective judgments of car sounds, in other words it enables to objectify the process of evaluating car sounds.

In a first aspect of the computer-based method for simulating a human-like decision in an environmental context, said computer-based method comprises pre-processing said environmental data with at least one filter before realising the computer based method for realising a bi-directional compression of data, said computer based method for realising a bi-directional compression of data receiving as input filtered environmental data.

This additional step enables, especially in an application to car audio sound treatment, the environmental data to go through a series of filters, such as band-pass filters, and pre-processing steps which helps increasing and diversifying the amount of information treated. For instance, in an application to car audio sound treatment, pre-processing steps can include denoising, convolution or any possible audio processing. In general it can be any kind of data operation or feature extraction.

An MPF architecture is mostly un-supervised and data-driven. Therefore, filtering out data may help in excluding useless or misleading information, helping MPF to focus on more important features.

In a second aspect of the computer-based method for simulating a human-like decision in an environmental context, the environmental data comprise at least one sample of raw sound recorded inside a car's cockpit with a noise sensor, and said method further comprises inputting said environmental data into auditory models before pre-processing with at least one filter the data outputted by said auditory models to deliver a plurality of different versions of the environmental data, said pre-processing being realized over every version of the environmental data.

Thus, this aspect of this computer-based method enables to objectify the subjective judgments of car sounds, in other words it enables to objectify the process of evaluating car sounds.

The raw sound can be recorded by using high fidelity microphones synchronized with the CAN bus data, i.e. the controller area network.

Auditory models are bio-inspired techniques to transform acoustic data into psycho-acoustic data. The correspondences between physical sound properties and human perception are complicated and far from being linear. Several operations are performed such as integration, temporal and frequency masking. From a computational point of view, an auditory model can be seen as a bank of filters whose task is to reproduce the operations performed by the human ear. This approach is widely used in speech recognition, but rarely considered in the automotive field.

The raw recorded sound is processed using the auditory models presented in scientific literature. The output of this step is the amount of energy in a set of determined frequency bands, considering the effects of the different auditory models, such as frequency selection, frequency and temporal masking.

A set of different Auditory Models are used to generate a plurality of "psychoacoustic versions" of the same raw sound to be processed in the following steps.

Another object of the invention is to propose a system for simulating a human-like behaviour in an environmental context comprising at least one sensor to capture environmental data, and an architecture with a memory for interacting with dynamic behaviours of a tool and an operator.

According to a general feature of the system for simulating a human-like behaviour in an environmental context, the architecture are configured to process the steps of said computer-based method for simulating a human-like decision in an environmental context defined here above.

Moreover, all the features in application WO 2014 009031 are integrated in the present specification.

In a first aspect of the system for simulating a human-like behaviour in an environmental context, the memory of the architecture is an artificial memory, the architecture being a first neural network having structures and mechanisms for abstraction, generalisation and learning, the first neural network implementation comprising an artificial hierarchical memory system, comprising a receiving port configured to receive data generated by sensors (on the tool), one or more first nodes configured to learn and recognize frequently occurring input attributes and sequences received from the receiving port, said one or more first nodes forming a second neural network comprising neurons as components and edges connecting two or more of said neurons in a graph, and an output port configured to output data constructed by the architecture and associated with the behaviours, whereby each of the one or more or essentially all of said first nodes is adapted for time series analysis, and comprises components connected in a topological graph or temporal graph.

In a second aspect of the system for simulating a human-like behaviour in an environmental context, it comprises a pre-processing filter to apply a set of different filters to the environmental data captured by the at least one sensor.

In a third aspect of the system for simulating a human-like behaviour in an environmental context, the environmental data comprise at least one sample of raw sound recorded inside a cares cockpit with a noise sensor, and said system further comprises auditory models configured to be applied to said recorded environmental data before the filtering pre-processing to output a plurality of different versions of the environmental data, said filtering pre-processing being realized over every version of the environmental data.

Another object of the invention is to propose an automotive vehicle comprising an electronic control unit including a system for simulating a humanlike behaviour in an environmental context.

BRIEF DESCRIPTION OF THE DRAWINGS

The invention will be better understood by reading hereafter, as examples and in a non-limitative way, in reference to the enclosed drawings on which.

DETAILED DESCRIPTION OF THE EMBODIMENTS

Figure 1:
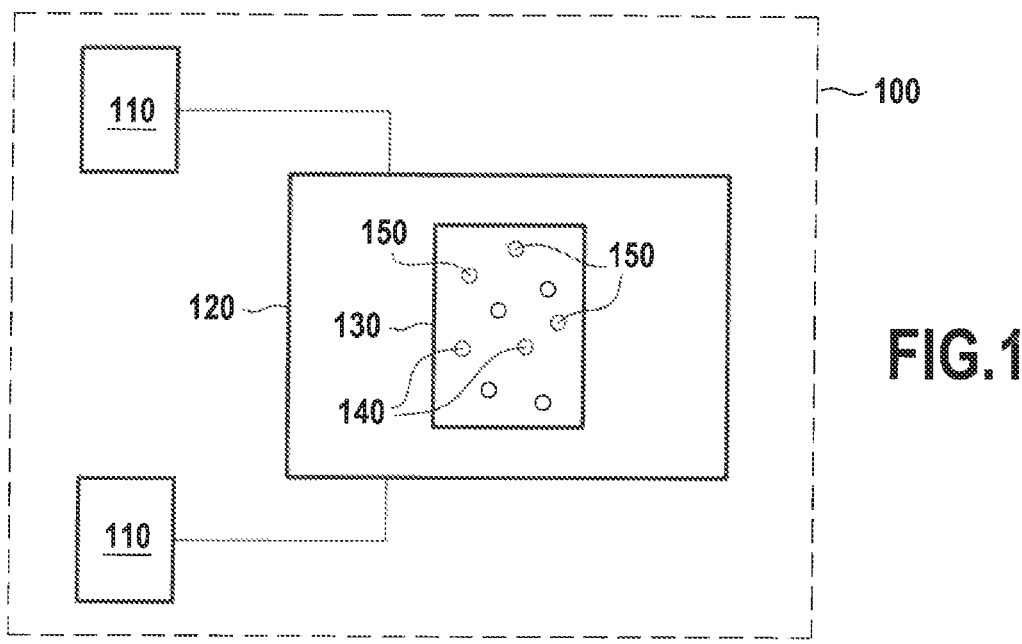
FIG. 1 shows schematically an artificial memory system according to an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 is schematically presented a system 100 for simulating a human-like behaviour in an environmental context according to an embodiment of the invention.

The simulation system 100 comprises two sensors 110 configured to capture environmental data. In this embodiment, the sensors 110 are two high fidelity microphones placed in two different locations inside a cockpit of a car.

The simulation system further comprises an architecture with an artificial memory system 120 configured to interact with dynamic behaviours of a tool and an operator. The architecture with an artificial memory system 120 is made of a first neural network having structures and mechanisms for abstraction, generalisation and learning.

The first neural network implementation comprises an artificial hierarchical memory system 130 comprising a receiving port configured to receive data generated by the microphones 110, one or more first nodes 140 configured to learn and recognize frequently occurring input attributes and sequences received from the receiving port, and one or more second nodes 150. The one or more first nodes 140 form a second neural network comprising neurons as components and edges connecting two or more of said neurons in a graph, and an output port configured to output data constructed by the architecture and associated with the behaviours, whereby each of the one or more or essentially all of said first nodes is adapted for time series analysis, and comprises components connected in a topological graph or temporal graph.

In embodiments of the present invention a human operator is mentioned such as a driver, captain, pilot, gamer. Such a person can be "autonomous". For example the operator commands can be given a priori, in the form of commands stored on a suitable storage medium that can be read by the system. For example if the operator is a driver and the tool is a vehicle such as an automobile, the commands might be destinations, expected times of arrival, expected fuel consumption, whether to drive aggressively, sportily, calmly etc. The actual human driver can also intentionally switch on the system and a command can be provided to drive the driver to the destination in such a way that accelerations, braking force, speed, fuel consumption etc. are according to the driver's normal behaviour or other behaviour. Also the system can take over in case of lack of commands. For example if it is detected that the driver is asleep the system brings the vehicle safely to a stand-still. Whether the driver has fallen asleep can be detected by an Awareness Check.

Embodiments of the present invention are based on the Memory Prediction Framework (MPF) and include an artificial hierarchical memory system. The artificial hierarchical memory system can be enhanced Hierarchical Temporal Memory (HIM) with improved capabilities for scene recognition/"classification" and/or a pre-processing stage. The system and method have been adapted to be able among others, to provide a number such as 10-15 samples or any suitable number of samples required, for e.g. more or less than half a second depending on the sampling frequency, a prediction about input operator commands due to the introduction of temporal events management as well as the above-mentioned pre-processing stage.

The architecture of the embodiment of FIG. 1 corresponds to the architecture described in document WO 2014 009031 comprising an enhanced hierarchical memory.

The Memory Prediction Framework is appropriate as a fundamental model, as it foresees nearly all the structures and mechanisms necessary for good learning, abstraction and generalization, e.g. feed-forward and feed-back signal flows within the network, their correspondence as measure of the degree of understanding of the situation, which is a prerequisite for assessing the generalization capabilities of the network. The MPF computational approach and its learning algorithms have been proven to deal well with diverse sensory channels, although sensory-specific pre-processing or tuning is still required. Once setup, i.e. adapted to a particular sensor modality no pre-processing is in principle required. However, it may from time to time be applied with advantage, for example as previously mentioned so-called primitives. Embodiments of the present invention may be seen as instantiations of suitable parts of the MPF.

Figure 2:
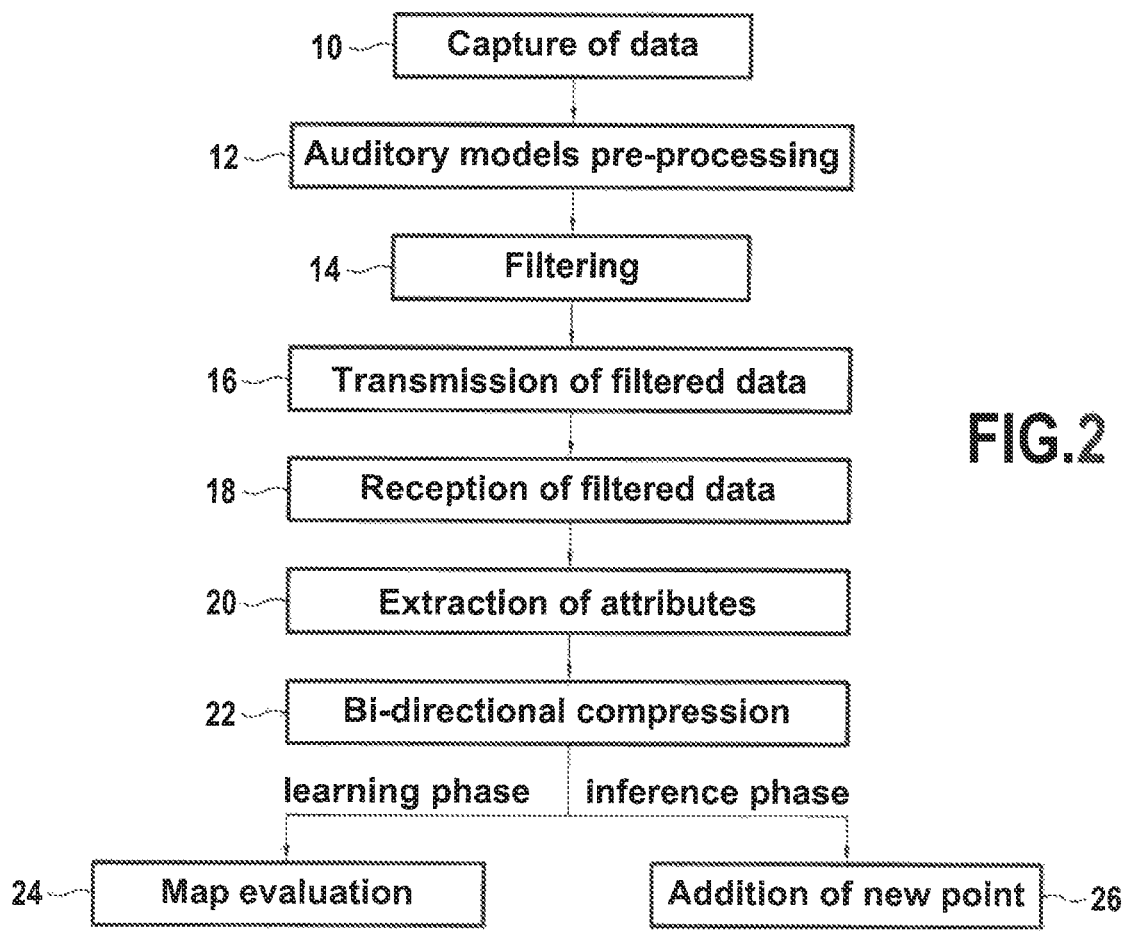
FIG. 2 shows a diagram of a computer-based method for simulating a human-like behaviour in an environmental context.

FIG. 2 schematically presents a computer-based method for simulating a human-like decision in an environmental context. This simulation method is realised by the nodes 140 and 150 inside the artificial hierarchical memory 130 of the simulation system 100.

In this example, the human-like decision is a behaviour of a driver of a car and the environmental context taken into account corresponds to the sounds surrounding him.

In a first step 10 of the simulation method, several high fidelity microphones synchronized with the CAN bus data record raw sounds inside the cockpit of the car. The raw sounds recorded are in a high dimensional configuration, for example a three dimension configuration.

In a second step 12 of the simulation method, the electronic signals corresponding to the recorded raw sounds are sent to the architecture with said artificial memory system 120 and are pre-processed through a set of auditory models to generate a plurality of "psychoacoustic versions" of each recorded raw sound which will be inputted into the artificial memory system 120 after a filtering step.

In a third step 14 of the simulation method, the electronic signals corresponding to the multiple psychoacoustic versions of each recorded raw sound are pre-processed through a set of band-pass filters.

In a following step 16 of the simulation method, the filtered sounds are sent to nodes to be processed by using a computer-based method for realising a bi-directional compression of data by compressing said filtered data into a two-dimensional map.

In step 18, a following step of the simulation method and first step of the compression method, the filtered sounds are received by other nodes or the same nodes.

In a second step 20 of the compression method, the nodes operate an extraction of attributes from each filtered raw sound in order to sort out the elements of each data considered as relevant for the method for simulating a human-like control behaviour.

The attributes extracted are e.g. spatiotemporal attributes in order to simplify the training of the computer-based method for simulating a human-like control behaviour.

In a third step 22 of the compression method, the nodes operate a compression of the attributes extracted from the filtered raw sounds.

The compression is realized by finding a set of n points Q belonging to a matrix y such that:

$$Q = \mathrm{argmin}_{r \in y^n} d(A_1(\mu_x(P)), A_2(\mu_y(t))) \quad \text{(Equation 1)}$$

$X=(x,\mu_x)$ and $Y=(y,\mu_y)$ being a two metric spaces with x a first space which dimension is greater or equal than the dimension of a second space y, $\mu_x$ a first metric on space x, $\mu_y$ a second metric on space y, and P being a first set of n points belonging to said first space x, and $d(.,.)$ being a symmetric distance function on the space of square matrices, while $A_1$ and $A_2$ are any two functions holding the following properties:

$A: R_+ \to [0, 1]$, i.e. A being a function defined for all positive real numbers and generating a value between 0 and 1, 0 and 1 being included;

$A(0)=1$, i.e. A being a function for which argument 0 will generate the value 1, $\lim_{x \to \infty} A(z)=0$, i.e. A being a function which has 0 for a limit as the argument approaches grows, $A(z_1) > A(z_2)$ if and only if $z_1 < z_2$, i.e. A being a strictly decreasing function.

Once equation 1 is solved for each of the n points of the first set of n points P, the correspondence between points, referenced as BiMap, of the two set of n points P and Q, i.e. BiMap=(P,Q), can be used as a translation atlas to transform points of said first space x into points of said second space y and vice-versa by means of equations 2 and equation 3, which follow.

With such a step, new points can thus be added to a map without the need to re-compute the whole map, and an inverse correspondence from space y to space x is created to recover a higher dimensional point from its lower dimensional representation.

Hence, any new point in belonging to space x can be compressed on space y by solving the following equation:

$$\tilde{y} = \mathrm{argmin}_{r \in y^n} d(A_1(\mu_x(P,m)), A_2(\mu_y(Q,t))) \quad \text{(Equation 2)}$$

and any new point t belonging to space y can be decompressed on space x by solving the following equation:

$$\tilde{x} = \mathrm{argmin}_{m \in x^n} d(A_1(\mu_x(P,m)), A_2(\mu_y(Q,t))) \quad \text{(Equation 3)}$$

where $\mu_x(P,m)$ and $\mu_y(Q,t)$ are the distance vectors between the points of BiMap and the new points in the corresponding respective spaces, BiMap being a pair of points, BiMap=(P,Q), solving equation 1.

Depending on the phase in the nodes 140 and/or 150 are, the compression method can act in three different ways.

In a learning phase, it can act as an input data pre-processing to let the network process data from a domain with less dimensions, thus saving both memory and computational power.

In an inference phase, after the learning phase, it can act either as an internode feedforward (FF) and feedback (FB) data compression or as a node output classifier.

When acting as an internode FF and FB data compression, the compression method is used to compress FF outputting from a lower level node and decompress the feedback outputting from a higher level one.

When acting as a node output classifier, the compression method helps to visualize the learning dynamics within a node, thus to help the human qualitative interpretation of the information stored in it. In this case, the compression method acts as a clustering based classifier.

If the architecture is in a learning phase, in a following step 24 of the computer-based method for simulating a human-like decision in an environmental context, the map of compressed data is evaluated by comparing said compressed data with different references previously memorized and tagging said map of compressed data with a label associated to one of the references.

If the architecture in an inference phase, instead of step 24, any new attribute extracted from a derivation of a new recorded raw sound is added in a step 26 to the map of compressed data and a signal is generated indicating which human-like decision to use to correspond to the state of the human using a system using the computer-based method for simulating a human-like decision in an environmental context.

Thus, during inference phase, the method for simulating a human-like decision can enable the architecture to perform several operations such as:

evaluate a new sound, by going through the process hereby described without modifying the learned memories;

infer common properties for sound that obtain similar judgments by analysing the low dimensional clustering performed by the BiMap;

improve the reliability of human judgments, by highlighting unusual behaviours on the maps;

generate sounds from a desired judgment; since all steps are reversible, new sounds with the expected judgments can be synthesized starting from their positions on the generated BiMap.

Hereafter is another example of a use of the invention which explains in a few more details certain aspects of the invention.

Virtual development methods are quickly gaining importance in the vehicle development process to cope with important business challenges: shortening time-to-market, optimising product quality, performance & value, reducing production & development costs, dealing with ever stricter emission & safety regulations.

A particular challenge in the Engine and Powertrain field is the upcoming European "Real Driving Emissions" (RDE) regulation. RDE compliance requires control of vehicle exhaust emissions over a wide area of operating conditions. This heavily impacts the engine calibration process which was traditionally based on a fixed driving cycle.

Virtualising part of the calibration process allows evaluation of vehicle & engine behaviour under various real-life driving conditions by running a physical or grey-box vehicle model over a virtual driving environment, operated by a virtual Driver Model.

The invention is used in this example to develop a new external Driver Model, i.e. a method for simulating a human-like control behaviour, that handles acceleration/brake, clutch and gearshift in a human-like way.

The methods of said invention are based on machine learning as it allows the model to learn from recorded data and to replicate driver's behaviour over any arbitrary route, making it suitable for RDE simulation.

The proposed method is composed of three main phases during which the nodes of the architecture proceed to build a relation between recorded data from tests and the simulation environment.

In a first phase, referred to as an extraction phase, the data captured by sensors, such as sensors 110, are sent to a Map Attribute Extractor. The map attribute extractor can either have as input the recorded electronic control unit (ECU) data along with the global positioning system (GPS) position or only GPS points to produce the attributes of the route connecting them. The first case prepares the input in order to learn a real driver's behaviour from data while the second one is necessary to extrapolate the learned behaviour over new routes.

In a second phase, referred to as a learning phase, captured data are inputted into a model to learn the real driver behaviour on the driven route and generalize it in order to replicate the behaviour over new routes. At this stage BiMap are used to learn real driver behaviour in the environment by sensing ECU and GPS data. In an inference stage BiMap generate the expected human behaviour in new environments.

In a third module, referred to as an inference phase, a Functional Mock-up Unit (FMU) controller cooperating in closed loop with the simulation environment uses the model build during the learning phase to implement the driver longitudinal behaviour by acting, in a human feasible way, on the car controls (gear-shift and, pedals).

This example exhibits an artificial intelligence driver, which learns real driver behaviour on recorded routes and generalize it on arbitrary routes. The driver model exhibits human-like driving behaviour both on vehicle pedals and gear selection, thus it is suitable to be used in simulating emissions.

The present invention may be realized on a processor system. The processing system may include a computing device or processing engine, e.g. a microprocessor or an FPGA. Any of the methods described above according to embodiments of the present invention or claimed may be implemented in a processing system. Such a processing system can include at least one customizable or programmable processor coupled to a memory subsystem that includes at least one form of memory, e.g., RAM, ROM, and so forth. It is to be noted that the processor or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information, such as parameter values. More elements such as network connections, interfaces to various devices, and so forth that allow connection to different types of physical sensors may be included. The various elements of the processing system may be coupled in various ways, including via a bus subsystem, for simplicity as a single bus, but which will be understood to those in the art to include a system of at least one bus. The memory of the memory subsystem may at some time hold part or all of a set of instructions that when executed on the processing system implement the steps of the method embodiments described herein.

The present invention also includes a computer program product which provides the functionality of any of the methods according to the present invention when executed on a computing device, e.g. on a processor of the kind described above. Software according to the present invention, when executed on a processing engine, can contain code segments that provide a Perceptual/Cognitive architecture with artificial memory for interacting with dynamic behaviours of a tool and an operator, wherein Perceptual/Cognitive architecture is based on a Memory Prediction Framework implementation having structures and mechanisms for abstraction and generalization and optionally learning, the Memory Prediction Framework implementation comprising an enhanced artificial hierarchical memory system. The software may be adapted to co-operate with a pre-processing stage. The software, when executed, may be adapted to provide a prediction about input operator commands based on temporal events management and to describe input data from physical sensors in terms of primitives and recurrent patterns.

The present invention also includes a computer program product having software according to the present invention, which when executed on a processing engine, can contain code segments that provide a Perceptual/Cognitive architecture with artificial memory for interacting with dynamic behaviours of a tool and an operator, wherein the Perceptual/Cognitive architecture is based on a Memory Prediction Framework implementation having structures and mechanisms for abstraction and generalization and optionally learning, the memory Prediction Framework implementation comprising an enhanced artificial hierarchical memory system. The software may be adapted to cooperate with a pre-processing stage, the software being adapted to describe input data from physical sensors in terms of primitives and recurrent patterns. The software may be adapted to allow feed-forward and feed-back signal flows and to develop the correspondence between the feed-forward and feed-back signal flows as a measure of a context check.

The present invention also includes a computer program product which includes software according to the present invention, which can contain code segments that provide A Perceptual/Cognitive architecture with artificial memory for interacting with dynamic behaviours of a tool and an operator when executed on a processing engine. The architecture can be based on a Memory Prediction Framework implementation having structures and the software may be adapted to provide mechanisms for abstraction and generalization and optionally learning, the memory Prediction Framework implementation comprising an enhanced artificial hierarchical memory system. The software may be adapted to cooperate with a pre-processing stage, the software being adapted to describe input data from physical sensors in terms of primitives and recurrent patterns, the software being adapted to output a compressed higher level information on the behaviour of the tool and/or operator based on inputs from the physical sensors.

The above software may be adapted for use with a Physical I/O Layer, an Enhanced hierarchical Memory, a Time Master, a Context Check, a Supervised Gating, a System Control Unit, and a User Control I/O Layer. The software can be adapted to translate physical sensor inputs without modifying the information content to a format manageable by the Enhanced hierarchical Memory. The software can be adapted to be taught and to recognize, and predict sequences of input patterns received from the Physical I/O Layer. The software can be adapted to output a compressed higher level information based on the physical sensor inputs received by the Physical I/O Layer.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practising the claimed invention, from a study of the drawings, the disclosure, and the appended claims.

For example, a single unit may fulfil the functions of several items recited in the claims. Any reference signs in the claims should not be construed as limiting the scope.

For example in embodiments of the present invention modelling actions can be as "paths" or "sequences" employing Markov chains, whereby such embodiments of HTMs can "follow" just one path.

The invention further provides for an architecture, being developed adhering to the Memory Prediction Framework (MPF) theory, in particular a system, based on the hMPF, developed to tackle a particular classification/prediction problem, having as its main processing element a artificial brain is provided.

The artificial brain, in turn, might comprise a number of processing nodes organized in layers and communicating each other by means of feed-forward (FF), feed-back (FB), and prediction signals. These signals are essentially Probability Density Functions (PDFs) expressing the likelihood for a particular input pattern to be a consequence of a particular world cause. The whole system might further check the status of the hierarchical network by means of context check signals also provided as outputs to the network.

The invention claimed is:

1. A computer based method for performing machine learning related to a bi-directional compression of high dimensional data by compressing the data into a lower dimensional map, the method comprising:
receiving data with a first dimension greater than one captured and transmitted by at least one sensor of a vehicle;
bi-directionally compressing the data or attributes derived from the data into compressed data with a second dimension lower than the first dimension; and
using machine learning based on the compressed data, generating and transmitting a signal including data corresponding to a state of the vehicle to a component of the vehicle,
wherein, for two metric spaces $X=(x,\mu_x)$ and $Y=(y,\mu_y)$ with x a first space having a dimension that is greater than or equal to a dimension of a second space y, $\mu_x$ a first metric on the first space x, $\mu_y$ a second metric on the second space y, the compression being performed by mapping pairs of points formed between a first set of n points P belonging to the first space x and a second set of n points Q belonging to the second space y, each point of the second set of n points Q being paired with a point of the first set of points P through the following equation:

$$Q=\mathrm{argmin}_{t \in y^n} d(A_1(\mu_x(P)), A_2(\mu_y(t))) \quad \text{(Equation 1)}$$

where $\mu_x(P)$ is a first symmetric distance matrix between points in P, $\mu_x(Q)$ is a second symmetric distance matrix between points in Q, and $d(.,.)$ is a symmetric distance function on the space of square matrices, while $A_1$ and $A_2$ are any two functions holding the following properties:
$A: R_+ \rightarrow [0, 1]$,
$A(0)=1$,
$\lim_{x \to \infty} A(z)=0$, and
$A(z_1)>A(z_2)$ if and only if $z_1<z_2$.

2. The computer based method of claim 1, further comprising extracting attributes from at least one data before initiating the bi-directional compression.

3. The computer based method according to claim 1, further comprising compressing a new point m belonging to the first space x on the second space y by solving the following equation:

$$\tilde{y}=\mathrm{argmin}_{t \in y^n} d(A_1(\mu_x(P,m)), A_2(\mu_y(Q,t))) \quad \text{(Equation 2)}$$

and decompressing a new point t belonging to the second space y on the first space x by solving the following equation:

$$\tilde{x}=\mathrm{argmin}_{m \in x^n} d(A_1(\mu_x(P,m)), A_2(\mu_y(Q,t))) \quad \text{(Equation 3)}$$

where $\mu_x(P,m)$ and $\mu_y(Q,t)$ are distance vectors between points of BiMap and the new points in the corresponding respective spaces, BiMap being a correspondence between points of the first space x and points of the second space y represented by equation 2 and equation 3, which Q points are calculated from points P by solving equation 1.

4. A computer based environmental method for simulating a human-like decision in an environmental context, the method comprising:
capturing environmental data with at least the sensor,
performing the computer based method according to claim 1 by compressing the data into lower dimensional map with the captured environmental data,
when the environmental data are captured during a learning phase of the computer-based model, evaluating the map of compressed data by determining a quality of the map based on the ability of the map to separate data with different properties, the captured data corresponding to known pre-recorded data that have been pre-evaluated, and
when the environmental data are captured after the learning phase, adding new points to the compressed data and generating the signal indicating which human-like decision to use to correspond to the state of the operator.

5. The computer based environmental method according to claim 4, further comprising pre-processing the environmental data with at least one filter before performing the computer based method, the computer based method receiving as inputs filtered environmental data.

6. The computer based environmental method according to claim 4, wherein:
   the environmental data include at least one sample of raw sound recorded inside a cockpit of the vehicle with at least one microphone, and
   the method further comprises inputting the environmental data into auditory models before pre-processing with at least one filter, the data outputted by the auditory models deliver a plurality of different versions of the environmental data, the pre-processing being realized over every version of the environmental data.

7. A system for simulating a human-like behaviour in an environmental context comprising the at least one sensor to capture the environmental data, and an computer architecture including a memory for interacting with dynamic behaviours of a tool and the operator,
   wherein the architecture is configured to process the steps of the computer-based method according to claim 4.

8. The system according to claim 7, wherein the memory of the architecture is an artificial memory, the architecture being a first neural network having structures and mechanisms for abstraction, generalisation and learning, the first neural network implementation defining the architecture including an artificial hierarchical memory system, the artificial hierarchical memory system including a receiving port configured to receive the data generated by the at last one sensor, one or more first nodes configured to learn and recognize frequently occurring input attributes and sequences received from the receiving port, the one or more first nodes forming a second neural network including neurons as components and edges connecting two or more of the neurons in a graph, and an output port configured to output data constructed by the architecture and associated with the behaviours, whereby each of the one or more of the first nodes is adapted for time series analysis, and includes components connected in a topological graph or temporal graph.

9. The system according to claim 7, further comprising a pre-processing filter to apply a set of different filters to the environmental data captured by the at least one sensor.

10. The system according to claim 7, wherein:
    the environmental data include at least one sample of raw sound recorded inside a cockpit of the vehicle with a noise sensor, which is the at least one sensor, and
    the system further comprises auditory models configured to be applied to the recorded environmental data before the filtering pre-processing to output a plurality of different versions of the environmental data, the filtering pre-processing being realized over every version of the environmental data.

11. An automotive vehicle comprising an electronic control unit including the system according to claim 7.

12. A non-transitory computer readable storage medium storing a computer program, which when executed by a computer, causes the computer to perform the computer based method according to claim 4, to contain code segments that provide a Perceptual/Cognitive architecture with artificial memory for interacting with dynamic behaviours of the tool and the operator, wherein the Perceptual/Cognitive architecture is based on a Memory Prediction Framework implementation having structures and mechanisms for abstraction and generalization and optionally learning, the memory Prediction Framework implementation including an enhanced artificial hierarchical memory system.

* * * * *